Aug. 27, 1935.　　F. H. GULLIKSEN　　2,012,426
REGULATING APPARATUS
Filed May 11, 1934
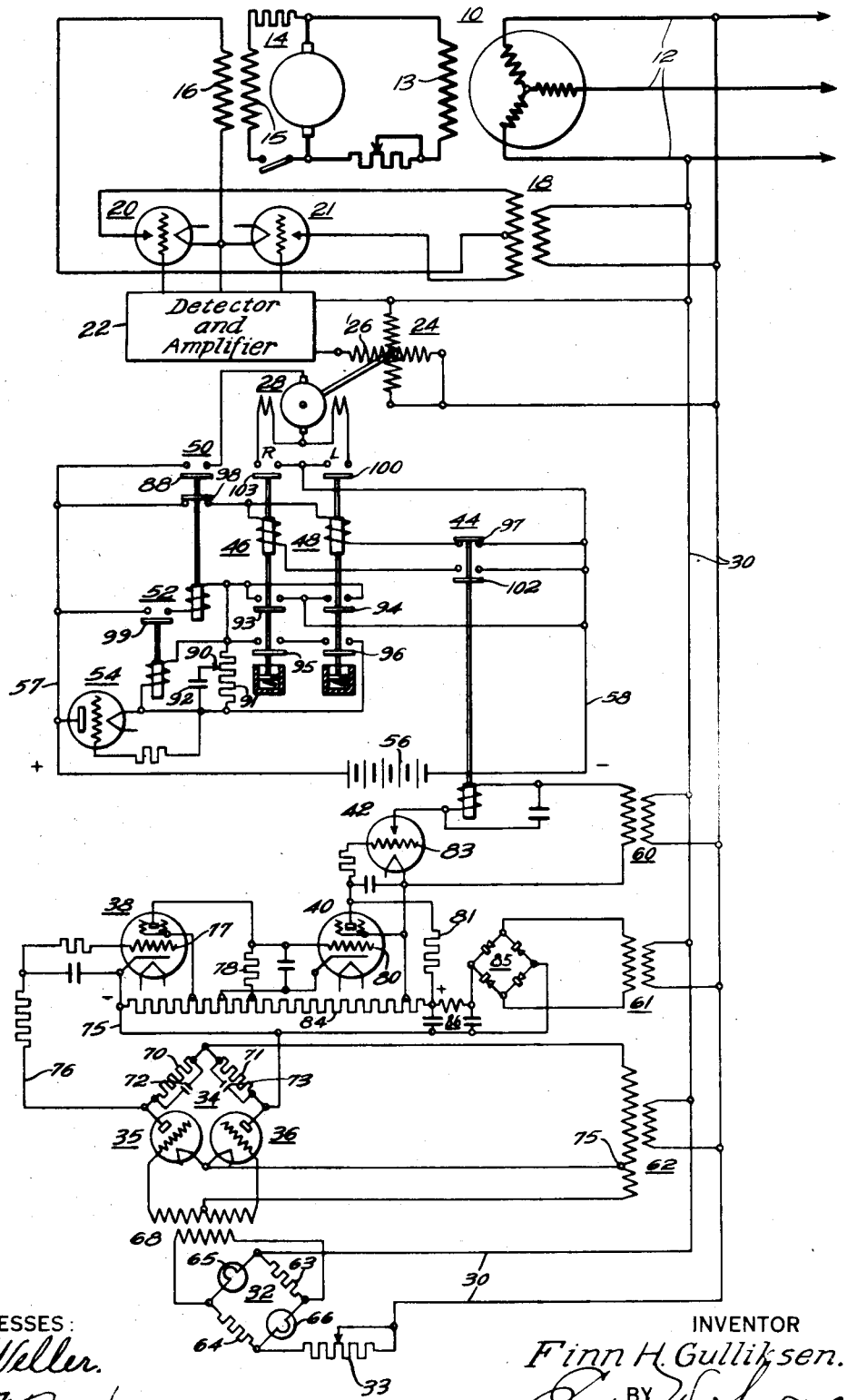
WITNESSES:
C. J. Weller.
C. F. Bryant.
INVENTOR
Finn H. Gulliksen.
BY
Ezra W. Savage
ATTORNEY Patented Aug. 27, 1935

2,012,426

UNITED STATES PATENT OFFICE 2,012,426

REGULATING APPARATUS

Finn H. Gulliksen, Wilkinsburg, Pa., assignor to Westinghouse Electric & Manufacturing Company, East Pittsburgh, Pa., a corporation of Pennsylvania Application May 11, 1934, Serial No. 725,118

9 Claims. (Cl. 171—312)

My invention relates to high sensitivity electrical regulators and has particular relation to monitoring equipment adapted to automatically maintain uniform the effective calibration of such regulators.

During recent years the practically attainable sensitivity of regulating systems has been greatly raised so that it is now not uncommon for electrical regulators, particularly those employing electronic tubes, to maintain the controlled quantity within a range as narrow as $\frac{1}{10}$ of 1% of its desired magnitude. In the operation of equipments of such extremely high sensitivity, it has been found that frequently they are incapable of maintaining an absolutely constant calibration. For example, when an electronic tube regulator is first started up, the tube devices and their control apparatus are relatively cold and for a given setting of the calibration adjusting means, function to maintain a particular value of the regulated quantity. As operation continues, however, these several devices warm up with the result that their inherent characteristics are slightly different, which difference causes the equipment, for the original setting of the calibration adjusting means, to maintain a slightly different value of the regulated quantity. For those special applications where supersensitivity is essential, such a change in effective calibration is highly objectionable. It is to the overcoming of this disadvantageous form of operation that the monitoring means of my invention are especially directed.

One object of my invention is to provide improved means for automatically maintaining constant the effective calibration of a regulator.

Another object of my invention is to eliminate from such means the errors which changes in temperature of the devices comprised thereby normally tend to produce.

A further object of my invention is to advantageously employ electronic tubes in a monitoring equipment of the type under consideration.

A still further object of my invention is to combine with such electronic tubes conventional relay devices in a manner to achieve the results desired.

My invention, itself, together with additional objects and advantages thereof will best be understood from the following description of a specific embodiment when taken in conjunction with the accompanying drawing in which the single figure is a diagrammatic representation of apparatus and circuits showing my improved monitoring means applied to an electronic tube voltage regulator.

Referring to the drawing, the regulating system with which my invention is disclosed is adapted to maintain constant the voltage of an alternating-current generator 10 represented as comprising armature windings directly connected with the conductors 12 of an output circuit and a field winding 13 which is energized by a direct current exciter 14. This exciter is provided with a field winding 15 adapted to be energized by the voltage of the machine and a second or regulating field winding 16 shown as deriving its energization from the output circuit 12 of the regulated generator 10 through a transformer 18 and controllable electronic rectifier tubes 20 and 21.

The effective conductivity of these tubes is controlled through the medium of detecting and amplifying equipment, generally indicated at 22, which is acted upon by the voltage of circuit 12 through a connection which includes a calibration changing device 24. Inasmuch as the equipment 22, which comprises additional electronic tubes and associated control apparatus, forms no part of the present invention, no attempt to show its details is here made.

It will suffice to say that, in operation of the regulating system just described, when the voltage of circuit 12 is of the desired value, the equipment 22 supplies to the excitation adjusting tubes 20 and 21 grid potentials which maintain them at an intermediate degree of effective conductivity. For this condition, the tubes supply to regulating field winding 16 an intermediate value of energizing current which maintains the voltage of exciter 14 at the value required to supply to the field winding 13 of the generator 10 an exciting current proper for the maintenance of the desired value of generator voltage.

As this voltage departs from such desired value, in say the decreasing direction, equipment 22 functions to raise the effected conductivity of tubes 20 and 21 to thereby increase the generator excitation and restore the voltage to normal. Similarly, as the regulated voltage rises above the desired value, the regulating equipment functions to reduce the generator excitation by an amount sufficient to lower the voltage back to normal.

To change the value at which the regulating system will maintain this voltage, device 24, which is illustrated in the form of a miniature induction regulator comprising a pair of adjustably coupled windings 26, may be changed in its setting to thereby vary the relation between the voltage supplied thereto from circuit 12 and that which it transmits to the detecting equipment 22. For each given setting of the device, the illustrated regulating system will, under unvarying conditions of tube temperature and certain other factors, maintain the voltage of generator 10 within a restricted range above and below a particular value, the magnitude of which range is determined by the sensitivity of the regulator.

As before pointed out, however, during certain conditions of regulator operation the temperature of the electronic tubes and associated control devices, and certain other uncontrollable conditions, are subject to change, which change results in the regulating equipment slightly shifting from the original or desired value the point at which it maintains the regulated quantity. An appropriate adjustment of device 24 may be caused to completely compensate for such shift, and if such adjustment can be made automatically the disadvantageous characteristic of the regulator may be completely eliminated. The monitoring equipment of my invention about to be described is capable of effecting such automatic adjustment.

This equipment comprises a reversible motor 28 adapted to actuate the calibration adjuster 24, which motor is brought into action as soon as the voltage of circuit 12, applied through the medium of conductors 30 to a special bridge circuit 32, departs from a value corresponding to the desired magnitude of the regulated quantity. Between the bridge circuit and the motor are intermediate control devices shown as comprising a second bridge circuit 34, which, through the medium of electronic tubes 35 and 36 comprised thereby, amplifies the output impulses of the first named circuit, a pair of additional amplifying tubes 38 and 40 which strengthen the impulses of circuit 34, a specially sensitive electronic tube 42 controlled by the equipment just named, a relay 44 controlled by tube 42, and voltage raising and voltage lowering relays 46 and 48 selectively controlled by relay 44 through the medium of time delay apparatus involving relays 50 and 52 and an associated electronic tube 54.

The actuating circuits of the devices last named are energized from a direct current source shown in the form of a battery 56 which maintains a conductor 57 at a positive potential with respect to a conductor 58. Likewise, potentials necessary for actuating the earlier named devices and associated control circuits are supplied from the voltage of regulated circuit 12 through the medium of transformers 60, 61 and 62.

The voltage error indicating bridge circuit 32 is directly connected, through conductors 30, to the generator bus without an intermediate transformer which would produce an objectionable temperature error. In this connection the usual adjusting rheostat 33 may be included. The bridge circuit comprises two opposite arms 63 and 64 of some resistor material having non-variable temperature coefficient of resistance. The other two arms 65 and 66 are tungsten lamps operated at a voltage at which their resistance is sensitive to voltage changes.

When the regulated voltage is normal, the voltage across the output terminals of this bridge circuit is zero. If the regulated voltage departs from normal, there will be impressed on transformer 68 a potential which will either be in phase with the regulated voltage or 180° out of phase therewith dependent upon whether this regulated voltage is too high or too low. As is known, the operation of such a voltage balancing bridge is based upon the fact that the resistance of a tungsten lamp will increase with increased lamp voltage, while that of the remaining two resistor arms is practically independent of the applied voltage.

The output of transformer 68 is impressed upon the grid elements of tubes 35 and 36 which, together with the pair of resistors 70 and 71, and capacitors 72 and 73 respectively connected in parallel therewith, are comprised by bridge circuit 34. The portion of the secondary winding of transformer 62 above the tap connection 75 impresses an alternating current voltage upon this bridge circuit while the portion of the secondary winding of the same transformer below point 75 functions to maintain the grid elements of the two tubes at a negative bias during those half cycles in which each tube anode is rendered positive with respect to the cathode. Consequently, the two tubes act as rectifiers, each respectively conducting current during alternate half cycles, and causing to appear across the particular resistor series connected therewith a direct current potential, the pulsations in which are smoothed out by the associated capacitors before referred to.

As the polarity and magnitude of the output voltage of transformer 68 changes, therefore, the current through one of the tubes 35 or 36 will increase while that through the other tube will decrease, and vice versa. This will unbalance the potentials appearing across resistors 70 and 71 so that their difference will appear as a direct current voltage between bridge output conductors 75 and 76. This output voltage is impressed upon the grid element 77 of amplifier tube 38 to appropriately control the amount of current which this tube conducts through resistor 78. The voltage drop across this resistor in turn functions to vary the biasing voltage applied to the grid element 80 of the second amplifier tube 40.

The resulting changes in conductivity in this tube in turn varies the current which this tube passes through a resistor 81. The voltage drop across this resistor, in turn, modifies the potential applied to the grid element 83 of relay control tube 42. In the illustrated connection of the electronic tubes just discussed, the required unidirectional energizing voltages are derived from a resistor 84 across the opposite ends of which is applied a direct current potential supplied from the regulated circuit through transformer 61, a full wave rectifier 85 and filtering apparatus 86.

Relay control tube 42 is a special device which may be rendered conductive when the grid voltage is changed in the positive direction and may be rendered completely non-conductive when this potential is changed sufficiently in the negative direction. When the regulated voltage increases above the desired value, the apparatus just described will function to make the grid bias of tube 42 sufficiently negative to render it non-conductive so that no current will be permitted to flow from transformer 60 through the actuating winding of relay 44. On the other hand, when the regulator voltage decreases below the desired value, the grid bias of the tube will be made sufficiently more positive to render the tube conductive and thereby complete an actuating circuit for relay 44.

When the regulated voltage is normal, the bias of tube 42 will alternately vary above and below the critical or break-down value and thereby cause relay 44 to alternately open and close. Such alternate opening and closing results from the slight variations in the regulated voltage above and below the desired average value which are invariably present in all regulated circuits. For such normal average conditions, however, they are of relatively short duration and even though their original magnitude is exceedingly small, the amplifying apparatus interposed between the regulated circuit and the tube 42 sufficiently magnifies them to provide the operation just named.

This relatively rapid vibratory action of relay 44 alternately actuates relays 46 and 48 which short actuations, however, are ineffective in energizing motor 28, since the motor circuit is interrupted by the normally opened contact member 88 of relay 50. This relay 50 is controlled by relay 52 which may be actuated only when one or the other of relays 46 and 48 is maintained in its actuated position for a substantial period of time. Such an interval may be of the order of several seconds dependent upon the adjustment of a tap connection 90 along a potentiometer resistor 91, which, together with a capacitor 92, forms a part of a grid potential accumulating circuit for electronic tube 54.

This circuit can be completed from conductor 57 through tube 54 and other equipment to the conductor 58 through the closure of either of contact members 93 or 94, respectively, comprised by relays 46 and 48. When so completed, the capacitor 92 starts to accumulate a direct current charge which in time builds up to the value required to render tube 54 sufficiently conductive to actuate relay 52. However, in the event that both of relays 46 and 48 are simultaneously actuated, contact members 95 and 96 thereof serve to complete a shunting circuit which discharges the capacitor and thereby necessitates that the interval of charge accumulation be re-accumulated. These two relays are each of the quick-closing slow-opening variety and thus function to cause the capacitor to discharge in the event that relay 44 changes its position before the required charge has accumulated.

Considering now the operation of the monitoring system of my invention, when the regulated voltage remains too high continuously during a period in excess of the before-named interval, tube 42 is in the manner before explained rendered non-conductive so that relay 44 occupies the unactuated position illustrated. Through the medium of contact member 97, this relay completes an actuating circuit for motor control relay 48, which circuit also includes a contact member 98 of relay 50. Relay 48 establishes through contact member 94 the before-detailed charging circuit for capacitor 92, which capacitor, after a given time, builds up sufficient voltage to increase the conductivity of tube 54, which tube then passes sufficient current through the actuating winding of relay 52 to move contact member 99 of this relay upwardly to thereby complete an actuating circuit for relay 50. Closure of relay 50 completes through contact member 88 the energizing circuit for motor 28 which had previously been set up by the upward actuation of contact member 100 of relay 48.

Thus energized, motor 28 adjusts device 24 in the voltage lowering direction. This adjustment continues until relay 48, the actuating circuit of which was interrupted by the upward movement of contacts 99 of relay 50, returns to the unactuated position illustrated. To effect such a return, approximately one half to one second is required in the illustrated slow-releasing device. The opening of relay 48 interrupts the motor circuit and further voltage lowering adjustment of device 44 is discontinued. If the regulated voltage still is too high, the sequence of relay operation just described will be repeated and the motor will continue to operate during a period of one-half to one second with spacing intervals dependent upon the adjustment of time-delay potentiometer tap 90.

In a similar manner, when the regulated voltage is too low continuously for a given time in excess of the critical value named, the motor 28 will be energized in the voltage raising direction. The sequence of effecting such energization includes a break-down of tube 42 to effect an actuation of relay 44, which actuation completes through contact member 102 thereof an actuating circuit for motor control relay 46. Contact member 93 of relay 46 completes, upon its actuation, a circuit between conductors 57 and 58 through which capacitor 92 is charged. After a given time tube 54 becomes sufficiently conductive to actuate relay 52 which in turn actuates relay 50 to complete through contact member 88 the motor energizing circuit which had previously been set up by contact member 103 of relay 46.

This slow-releasing relay 46 remains closed during an interval approximately one-half to one second during which time the motor 28 operates calibration adjusting device 24 in the voltage-raising direction. Upon the opening of relay 46, motor operation is interrupted. If the regulated voltage is still too low the sequence of relay operations just described will be repeated and as in the preceding case, the motor will operate during periods of from one-half to one second with spacing intervals of considerably longer duration.

Although I have shown and described a certain specific embodiment of my invention, I am fully aware that many modifications thereof are possible. My invention, therefore, is not to be restricted except insofar as is necessitated by the prior art and by the scope of the appended claims.

I claim as my invention:

1. In combination with a regulator having an adjuster for selecting the average value at which the regulator is adapted to maintain a quantity, monitoring equipment for maintaining uniform the effective calibration of said regulator comprising means for actuating said adjuster, and operation control means for said actuating means which are responsive to excessive variations in the regulated quantity from a preselected value which uninterruptedly persist for a given time, said means comprising a change-responsive bridge circuit acted upon by the regulated quantity, an electronic tube controlled by the output of said bridge circuit, and time-delay relay means controlled by said tube.

2. In combination with a regulator having an adjuster for selecting the average value at which the regulator is adapted to maintain a quantity, a monitoring system for maintaining uniform the effective calibration of said regulator comprising change-responsive means acted upon by the regulated quantity, an electronic tube so controlled by said means as to be non-conductive when the regulated quantity substantially departs from a given value in one direction, conductive when departure is in the other direction, and alternately conductive and non-conductive when there is no such substantial departure, and means responsive to the current passed by said tube for actuating said regulator adjuster.

3. In combination with a regulator having an adjuster for selecting the average value at which the regulator is adapted to maintain a quantity, a monitoring system for maintaining uniform the effective calibration of said regulator comprising change-responsive means acted upon by the regulated quantity, an electronic tube so controlled by said means as to be non-conductive when the regulated quantity substantially departs from a given value in one direction, conductive when departure is in the other direction, and alternately conductive and non-conductive when there is no such substantial departure, a relay responsive to the current passed by said tube, and time-delay means responsive to the position of said relay for actuating said regulator adjuster.

4. In combination with a regulator having an adjuster for selecting the average value at which the regulator is adapted to maintain a quantity, a monitoring system for maintaining uniform the effective calibration of said regulator comprising change-responsive means acted upon by the regulated quantity, an electronic tube controlled by said means, a relay responsive to the current passed by said tube, means for actuating said regulator adjuster, a pair of relays selectively responsive to the position of the first-named relay for respectively controlling operation of said adjuster actuator in one direction or the other, and means for making effective the control of either of said last-named relays only when an objectionable variation in the regulated quantity uninterruptedly persists for a given time.

5. In combination with a regulator for maintaining a quantity at a desired average value, said regulator having an adjuster for selecting the magnitude of said value, a monitoring system for maintaining uniform the effective calibration of said regulator comprising change-responsive means acted upon by the regulated quantity, an electronic tube controlled by said means, a relay responsive to the current passed by said tube, means for actuating said regulator adjuster, a pair of relays selectively responsive to the position of the first-named relay for respectively controlling operation of said adjuster actuator in one direction or the other, and means for making effective said actuation of either of said last-named relays only when a variation in the regulated quantity uninterruptedly persists for a given time.

6. In combination with a regulator having a calibration-adjuster associated therewith, monitoring equipment comprising means for actuating the adjuster, means including a relay so responsive to the quantity which the regulator controls that when that quantity is of the desired value relay vibration results, when the quantity substantially departs in one direction from said value the relay is actuated to one position and when the departure is in the opposite direction the relay is actuated to a second position, and a pair of relays respectively responsive to sustained actuation of the first-named relay in one or the other of its mentioned positions for controlling operation of said adjuster actuating means in one direction or the other.

7. In combination with a regulator having a calibration-adjuster associated therewith, monitoring equipment comprising a motor for operating the adjuster, means including a relay so responsive to the quantity which the regulator controls that when that quantity is of the desired value relay vibration results, when the quantity substantially departs in one direction from said value the relay is actuated to one position and when the departure is in the opposite direction the relay is actuated to a second position, a pair of quick-actuating slow-releasing relays respectively responsive to actuation of the first-named relay to one or the other of its mentioned positions adapted to control operation of said adjuster motor in one direction or the other, and means for rendering effective said motor operation control only when either of said relays uninterruptedly occupies its actuated position for a given time.

8. In combination with a regulator having a calibration-adjuster associated therewith, monitoring equipment comprising a motor for operating the adjuster, means including a relay so responsive to the quantity which the regulator controls that when that quantity is of the desired value relay vibration results, when the quantity substantially departs in one direction from said value the relay is actuated to one position and when the departure is in the opposite direction the relay is actuated to a second position, a pair of quick-actuating slow-releasing relays respectively responsive to actuation of the first-named relay to one or the other of its mentioned positions adapted to control operation of said adjuster motor in one direction or the other, a relay requiring actuation to render effective said motor operation control, an electronic tube adapted to control the actuation of said relay, and a grid-bias accumulating capacitor charged in accordance with the selective actuation of said motor-control relays for controlling the conductivity of said tube.

9. In combination with a regulator having a calibration-adjuster associated therewith, monitoring equipment comprising a motor for operating the adjuster, means including a relay so responsive to the quantity which the regulator controls that when that quantity is of the desired value relay vibration results, when the quantity substantially departs in one direction from said value the relay is actuated to one position and when the departure is in the opposite direction the relay is actuated to a second position, a pair of quick-actuating slow-releasing relays respectively responsive to actuation of the first-named relay to one or the other of its mentioned positions adapted to control operation of said adjuster motor in one direction or the other, a relay requiring actuation to render effective said motor operation control, an electronic tube adapted to control the actuation of said relay, and a grid-bias accumulating capacitor charged in accordance with the selective actuation of said motor control relays for controlling the conductivity of said tube, a simultaneous actuation of both of said relays functioning to return said capacitor to its fully discharged condition.

FINN H. GULLIKSEN.